(12) United States Patent
Fletcher et al.

(10) Patent No.: US 7,169,031 B1
(45) Date of Patent: Jan. 30, 2007

(54) SELF-CONTAINED CONDITIONING ABRASIVE ARTICLE

(75) Inventors: Timothy D. Fletcher, Lino Lakes, MN (US); Paul S. Lugg, Woodbury, MN (US); Vincent D. Romero, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 32 days.

(21) Appl. No.: 11/191,722

(22) Filed: Jul. 28, 2005

(51) Int. Cl.
*B24D 11/00* (2006.01)

(52) U.S. Cl. .................... 451/528; 451/533; 451/539; 51/295

(58) Field of Classification Search ........ 451/526–528, 451/533, 539; 51/295
See application file for complete search history.

(56) References Cited

U.S. PATENT DOCUMENTS

| | | | |
|---|---|---|---|
| 4,311,489 A * | 1/1982 | Kressner | 51/298 |
| 4,652,275 A * | 3/1987 | Bloecher et al. | 51/298 |
| 4,799,939 A * | 1/1989 | Bloecher et al. | 51/293 |
| 5,078,753 A * | 1/1992 | Broberg et al. | 51/298 |
| 5,152,917 A | 10/1992 | Pieper et al. | |
| 5,304,223 A | 4/1994 | Pieper et al. | |
| 5,435,816 A | 7/1995 | Spurgeon et al. | |
| 5,437,754 A | 8/1995 | Calhoun | |
| 5,454,844 A | 10/1995 | Hibbard et al. | |
| 5,562,745 A * | 10/1996 | Gagliardi et al. | 51/298 |
| 5,632,668 A * | 5/1997 | Lindholm et al. | 451/42 |
| 5,651,729 A | 7/1997 | Benguerel | |
| 5,820,450 A * | 10/1998 | Calhoun | 451/530 |
| 5,840,090 A * | 11/1998 | Ho et al. | 51/295 |
| 5,958,794 A | 9/1999 | Bruxvoort et al. | |
| 5,975,988 A | 11/1999 | Christianson | |
| 6,217,413 B1 | 4/2001 | Christianson | |
| 6,319,108 B1 | 11/2001 | Adefris et al. | |
| 6,364,747 B1 * | 4/2002 | Gagliardi | 451/28 |
| 6,485,355 B1 | 11/2002 | Economikos et al. | |
| 6,551,366 B1 | 4/2003 | D'Souza et al. | |
| 6,595,831 B1 | 7/2003 | Hirokawa et al. | |

(Continued)

FOREIGN PATENT DOCUMENTS

| | | |
|---|---|---|
| JP | 63-274782 | 11/1988 |
| JP | 2000-339672 | 12/2000 |

OTHER PUBLICATIONS

Fletcher, U.S. Appl. No. 11/191,711, filed Jul. 28, 2005, titled "Abrasive Agglomerate Polishing Method".

*Primary Examiner*—M. Rachuba
(74) *Attorney, Agent, or Firm*—Dean M. Harts

(57) ABSTRACT

Provided is a fixed abrasive article for polishing a workpiece having a hardness comprising (a) a substrate having a first surface and a second surface, (b) a region of abrasive composites distributed on the first surface of the substrate, and (c) a region of conditioning amalgams distributed on the first surface of the substrate. The abrasive composites include a composite binder and abrasive particles of a first hardness, which first hardness is higher than the hardness of the workpiece. The amalgams include an erodible binder and conditioning particles sufficient to condition the composite binder and having a second hardness, which second hardness is less than the hardness of the workpiece and greater than the hardness of the composite binder. Also provided are other abrasive articles, and methods of making them.

23 Claims, 1 Drawing Sheet

U.S. PATENT DOCUMENTS

| | | |
|---|---|---|
| 6,602,117 B1 | 8/2003 | Chopra et al. |
| 6,645,624 B2 | 11/2003 | Adefris et al. |
| 6,830,500 B2 | 12/2004 | Chopra et al. |
| 6,899,611 B2 * | 5/2005 | Reinhardt et al. .......... 451/527 |
| 7,101,819 B2 * | 9/2006 | Rosenflanz et al. .......... 501/10 |
| 2003/0100246 A1 | 5/2003 | Hirokawa et al. |
| 2004/0014318 A1 | 1/2004 | Chopra et al. |
| 2004/0166779 A1 | 8/2004 | Balijepalli et al. |
| 2004/0235407 A1 | 11/2004 | Grunwald |

* cited by examiner

US 7,169,031 B1

SELF-CONTAINED CONDITIONING ABRASIVE ARTICLE

TECHNICAL FIELD

This invention relates to a material having a first abrasive suitable for polishing a workpiece, which first abrasive is provided in agglomerates, and conditioning particles suitable for conditioning or dressing agglomerates of the first abrasive, and methods for making these materials.

BACKGROUND

Coated abrasive articles typically consist of a layer of abrasive grits adhered to a backing. Three-dimensional, textured, fixed abrasive articles include a plurality of abrasive particles and a binder in a pattern. After use, the abrasive grits become dull and worn, so an additional process is used to expose fresh abrasive.

Slurries containing loose abrasive particles dispersed in a liquid and a polishing pad also have been used for polishing. Lapping is a grinding process that typically involves a slurry of loose abrasive grits, such as aluminum oxide in a liquid, flowed across a rotating lap plate, typically a metal such as cast iron. This provides an abrasive film between the polishing pad and the workpiece that enables stock removal from a single side or from both sides simultaneously.

SUMMARY OF INVENTION

Briefly, the present invention provides a fixed abrasive article for polishing a workpiece having a hardness comprising (a) a substrate having a first surface and a second surface, (b) a region of abrasive composites distributed on the first surface of the substrate, the abrasive composites including a composite binder and abrasive agglomerates, which agglomerates include abrasive particles of a first hardness together with a matrix material, and wherein the first hardness is higher than the hardness of the workpiece, and (c) a region of conditioning amalgams distributed on the first surface of the substrate, the amalgams including an erodible binder and conditioning particles sufficient to condition the composite binder and having a second hardness, which second hardness is less than the hardness of the workpiece and greater than the hardness of the composite binder.

In another aspect, the present invention provides a fixed abrasive article for polishing a workpiece having a Knoop hardness below about 2500 kg/mm$^2$ comprising (a) a substrate having a first surface and a second surface, (b) a region of abrasive composites distributed on the first surface of the substrate, the abrasive composites including a composite binder and abrasive agglomerates, which agglomerates include abrasive particles having a Knoop hardness of at least about 2500 kg/mm$^2$ together with a matrix material, and (c) a region of conditioning amalgams distributed on the first surface of the substrate, the amalgams including an erodible binder and conditioning particles having a Knoop hardness below the hardness of the workpiece and higher than the hardness of the matrix material of the abrasive agglomerates.

In another aspect, the present invention provides a polishing system comprising (1) a fixed abrasive article for polishing a workpiece having a hardness wherein the fixed abrasive article comprises (a) a substrate having a first surface and a second surface, (b) a region of abrasive composites distributed on the first surface of the substrate, the abrasive composites including a composite binder and abrasive agglomerates, which agglomerates include abrasive particles of a first hardness together with a matrix material, and wherein the first hardness is higher than the hardness of the workpiece, and (c) a region of conditioning amalgams distributed on the first surface of the substrate, the amalgams including an erodible binder and conditioning particles of a second hardness, which second hardness is less than the hardness of the workpiece and greater than the hardness of the matrix material of the abrasive agglomerates. The polishing system may also further include a slurry abrasive.

In another aspect, the present invention provides a method of making a fixed abrasive article for polishing a workpiece having a hardness, such as described above, comprising (a) providing a substrate having a first surface and a second surface, (b) providing a region of abrasive composites distributed on the first surface of the substrate, the abrasive composites including a composite binder and abrasive agglomerates, which agglomerates include abrasive particles of a first hardness together with a matrix material, and wherein the first hardness is higher than the hardness of the workpiece, and (c) providing a region of conditioning amalgams distributed on the first surface of the substrate, the amalgams including an erodible binder and conditioning particles of a second hardness, which second hardness is less than the hardness of the workpiece and which is sufficient to condition the matrix material of the abrasive agglomerates.

In still another aspect, the present invention provides a method of making a fixed abrasive article, such as described above, for polishing a workpiece having a Knoop hardness below about 2500 kg/mm$^2$ comprising (a) providing a substrate having a first surface and a second surface, (b) providing a region of abrasive composites distributed on the first surface of the substrate, the abrasive composites including a composite binder and abrasive agglomerates, which agglomerates include abrasive particles having a Knoop hardness of at least about 2500 kg/mm$^2$ together with a matrix material, and (c) providing a region of conditioning amalgams distributed on the first surface of the substrate, the amalgams including an erodible binder and conditioning particles having a Knoop hardness below the hardness of the workpiece and higher than the hardness of the matrix material of the abrasive agglomerates.

In still another aspect, the present invention provides a fixed abrasive article for polishing a workpiece comprising a substrate having a first surface and a second surface, a region of abrasive composites distributed on the first surface of the substrate, the abrasive composites including a composite binder and abrasive agglomerates, which agglomerates include abrasive particles having a hardness of at least about 2500 kg/mm$^2$ together with a matrix material having a hardness of at least about 18 kg/mm$^2$; and a region of conditioning amalgams distributed on the first surface of the substrate, the amalgams including an erodible binder and conditioning particles sufficient to condition the composite binder and having a second hardness, which second hardness is less than 2500 kg/mm$^2$, about equal to or greater than the hardness of the composite binder, and about equal to or greater than the hardness of the matrix. In some aspects, the conditioning particles have an average particle size below the average particle size of the abrasive particles.

It is an advantage of one embodiment of the present invention to provide a self-contained conditioning abrasive in a fixed abrasive article containing conditioning particles, such that the conditioning particles are capable of dressing abrasive agglomerates within an abrasive composite. With the present invention, the conditioning particles do not appreciably modify the surface of a workpiece while the abrasive in the fixed abrasive article does modify the surface of the workpiece. In some embodiments of the present invention, the conditioning particles have an average particle size below the average particle size of the abrasive particles within the abrasive agglomerates in the abrasive composite. In another aspect, the fixed abrasive article uses conditioning particles provided on a fixed abrasive article, such that the conditioning particles can be released during abrasive finishing.

In the present invention, the abrasive particles (first hardness) are capable of abrading a workpiece while the conditioning particles (second hardness) condition or abrade the matrix material of the abrasive agglomerates, but have little, if any, effect on the workpiece. For example, a typical lapping process may take several minutes to several hours to polish a workpiece, but the conditioning particles (of the second hardness) alone would take at least several days, weeks, or months to polish a similar workpiece, if polishing eventually occurred.

During an abrasive finishing process the "self-conditioning" abrasive article of one aspect of the present invention releases conditioning particles, which promote breakdown of the fixed abrasive, which in turn keeps active cutting points on the surface of the abrasive. The conditioning particles need not be of sufficient hardness or size to cause any significant workpiece removal rate attributable to these particles (as is required for slurry lapping). The increased presence of active cutting points on the abrasive surface increases the removal rate and avoids the removal rate drop commonly observed for fixed abrasives used on hard workpieces.

Other features and advantages of the invention will be apparent from the following detailed description of the invention and the claims. The above summary is not intended to describe each illustrated embodiment or every implementation of the present disclosure. The figures and the detailed description that follow more particularly exemplify certain preferred embodiments utilizing the principles disclosed herein.

DETAILED DESCRIPTION OF PRESENTLY PREFERRED EMBODIMENTS

Figure 1:
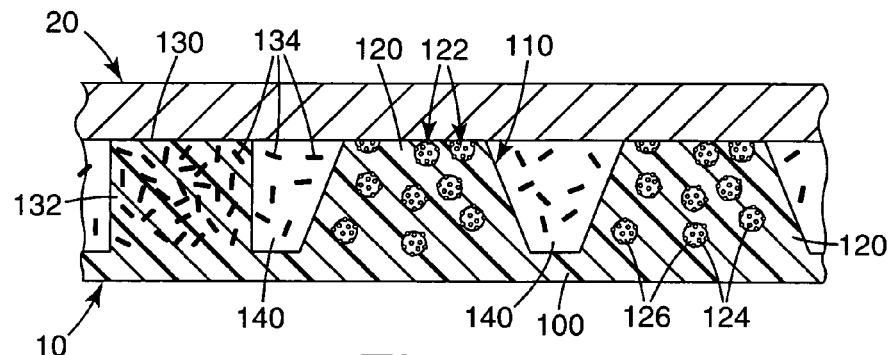
FIG. 1 shows a partial cross sectional view of an article of the invention in contact with a workpiece, which is not drawn to scale.

All numbers are herein assumed to be modified by the term "about," unless stated otherwise. The recitation of numerical ranges by endpoints includes all numbers subsumed within that range (e.g., 1 to 5 includes 1, 1.5, 2, 2.75, 3, 3.80, 4, and 5).

The present invention provides a fixed abrasive article for polishing a workpiece having a hardness. The abrasive article comprises a substrate that has a top or first surface and a bottom or second surface. On the first surface of the substrate of the abrasive article there is a (at least one) region of distributed abrasive composites. These abrasive composites include a composite binder and abrasive particles. The abrasive particles have a first hardness, and can be provided in agglomerates together with a matrix material. The hardness of these abrasive particles is higher than the hardness of the intended workpiece, such that these abrasive particles polish or abrade the workpiece during the intended use of the fixed abrasive article. Also on the first surface of the substrate of the abrasive article there is a (at least one) region of distributed conditioning amalgams. These amalgams, or composites, or sub-assemblies, include an erodible binder and conditioning particles sufficient to condition the composite binder. The conditioning particles have a second hardness, which second hardness is less than the hardness of the workpiece and greater than the hardness of the composite binder. The conditioning particles also have sufficient hardness and suitable size range to condition the matrix material of the abrasive agglomerates. Thus, this aspect of the invention provides a self-conditioning or in situ conditioning abrasive article, wherein the conditioning particles act upon the abrasive composite and/or the matrix material, releasing new surfaces of abrasive particles, which may be within abrasive agglomerates, but preferably the conditioning particles do not abrade or scratch the workpiece. In some aspects, the conditioning particles also condition the composite binder, which is useful, for example, when the abrasive particles or abrasive agglomerates are provided in a three-dimensional fixed abrasive article.

In another embodiment, the present invention provides a fixed abrasive article for polishing a workpiece having a Knoop hardness below about 2500 kg/mm$^2$. In this embodiment, the fixed abrasive article comprises a substrate along with regions of abrasive composites and regions of conditioning composites or mixtures or amalgams, as described above. The abrasive composites comprise abrasive agglomerates, which agglomerates include abrasive particles having a Knoop hardness of at least about 2500 kg/mm$^2$ together with a matrix material, such that the abrasive particles have a hardness above the hardness of the workpiece. The conditioning amalgams distributed on the first surface of the substrate include an erodible binder and conditioning particles having a Knoop hardness below the hardness of the workpiece and higher than the hardness of the matrix material of the abrasive agglomerates. Thus, various aspects of the invention provide a self-conditioning abrasive article as described above.

In another embodiment, the present invention provides a polishing system. This system comprises a fixed abrasive article for polishing a workpiece having a predetermined hardness. The fixed abrasive article comprises a substrate having a first surface and a second surface. The fixed abrasive article also comprises a region of abrasive composites distributed on the first surface of the substrate, the abrasive composites including a composite binder and abrasive agglomerates, which agglomerates include abrasive particles of a first hardness together with a matrix material, and wherein the first hardness is higher than the hardness of the workpiece. The fixed abrasive article further comprises a region of conditioning amalgams distributed on the first surface of the substrate, the amalgams including an erodible binder and conditioning particles of a second hardness, which second hardness is less than the hardness of the workpiece and greater than the hardness of the matrix material of the abrasive agglomerates. The polishing system may also further include a slurry abrasive, which can abrade or condition the matrix material and/or the composite binder, but preferably not abrade workpiece. Thus, various aspects of the invention also provide a polishing system that includes a self-conditioning or in situ conditioning abrasive article as described above.

Turning now to FIG. 1, abrasive article 10 is shown in contact with workpiece 20. Abrasive article 10 is composed of several elements. Upon substrate 100 is provided abrasive composites 110, which include shaped regions of composite binder 120, and abrasive agglomerates 122. Abrasive agglomerates 122 include matrix material 126 together with particles of first abrasive 124. Also upon substrate 100 is provided a conditioning composite 130, which includes a shaped region of erodible binder 132, and conditioning particles 134. Particles of the conditioning particles 134 also are shown suspended in a working fluid within channels 140, which lie between conditioning composite 130 and abrasive composites 110. Channels 140 can direct slurry and working fluid movement during the use of abrasive article 10. The drawings are not to scale. In some embodiments, conditioning particles 134 have an average particle size close to, or lower than, the size of the abrasive particles, for example, conditioning particles 134 can have an average particle size of 125%, 100%, 75%, or even less, as compared to the average particle size of first abrasive 124. Conditioning particles preferably have an average particle size of at least about 50% of the average particle size of the abrasive particles. In addition, conditioning particles also can be included in composite binder 120.

In one embodiment, two or three of the substrate 100, composite binder 120, and erodible binder 132 can be made of the same material. For example, a polymeric resin can be used as the binder for one or two of the abrasive features mentioned as well as for the substrate. Thus, FIG. 1 shows one option having substrate 100 integrally with composite binder 120 and erodible binder 132. In one aspect, a thin substrate is used with another supporting layer. The substrate and supporting layer can be different or can be the same material. They can be attached via any known means, such as via adhesive, pressure-sensitive adhesive, casting and curing, melt casting, etc. For example, a thin substrate 100 can be attached to a supporting layer of a material such as polyester or polycarbonate via an adhesive, such as a double-sided pressure-sensitive adhesive tape.

Figure 2A:
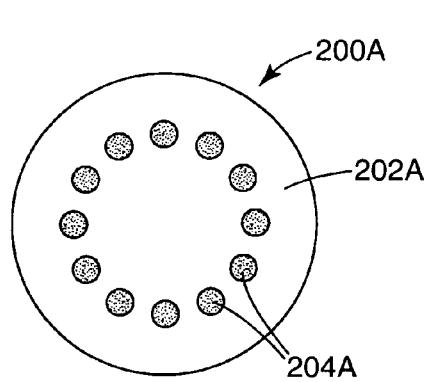
FIGS. 2A through 2D show exemplary configurations of the invention with regions of abrasive composites and regions of conditioning composites.
Figure 2B:
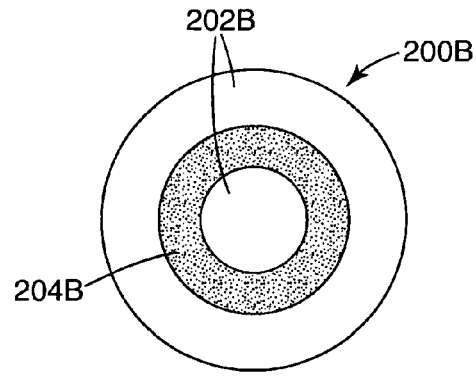
Figure 2C:
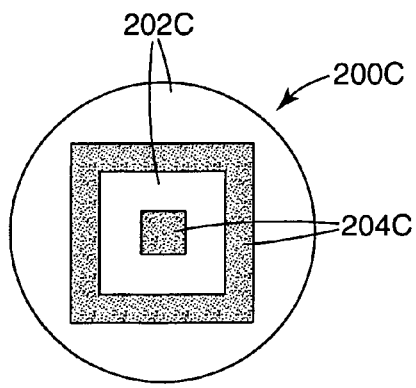
Figure 2D:
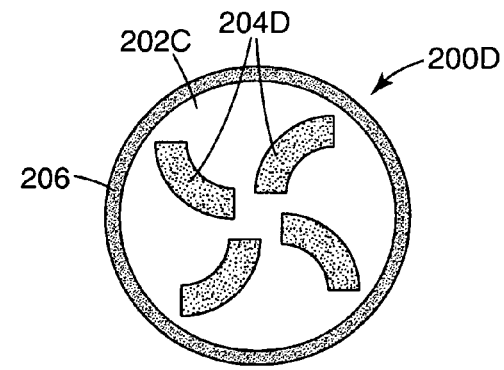

FIGS. 2A through 2D show exemplary configurations of the invention with regions of abrasive composites and regions of conditioning composites. More specifically, FIG. 2A shows abrasive article 200A with a general region or field of abrasive composites 202A and in selected regions within this field are provided regions of conditioning composite 204A, shown here in a circular layout. FIG. 2B shows abrasive article 200B with a general region or field of abrasive composites 202B and in selected regions within this field is provided an annular region of conditioning composite 204B. FIG. 2C shows abrasive article 200C with a general region or field of abrasive composites 202C and in selected regions within this field are provided regions of conditioning composite 204C, shown here in an annular rectangular layout. FIG. 2D shows abrasive article 200D with a general region or field of abrasive composites 202D and in selected regions within this field are provided regions of conditioning composite 204D, shown here in a design that is capable of directing working fluid and/or slurry toward the center of abrasive article 200D when the article is rotated in a clockwise direction. In addition, FIG. 2D shows slurry retainer 206 about the periphery of abrasive article 200D. Such a retainer can be used in many embodiments of the present invention in a location such as shown in FIG. 2D (about the periphery) or in other locations to retain slurry with the abrasive article for a desired duration. That is, the retainer can be about the entire periphery (as shown) or provided in intermittent regions, such as to control the amount of material retained. In addition, regions of conditioning composite can be provided to preferentially direct slurry and/or working fluid to, for example, carry liquid toward the center, such as shown in FIG. 2D with conditioning composite 204D. In alternative embodiments, the retainer can be designed to carry liquid away from the center, or in another desired path. The retainer may be abrasive composite, conditioning amalgams, a combination thereof, or still another material.

In other aspects of the present invention, conditioning fluid-directing regions can be used independently of, or in cooperation with, the abrasive regions. For example, wipers comprising the resin of the matrix material, the composite binder, the erodible binder, or another material can be included in the design for moving, removing, and/or retaining conditioning material.

Substrates useful in the present invention include those known useful in coated abrasive and fixed abrasives, such as polymeric film, cloth, paper, foam, nonwovens, treated or primed versions thereof, and combinations thereof. Examples include polyester films, polyolefin films (e.g., polyethylene and propylene film), polyamide films, polyimide films and the like. A thin substrate can be reinforced using another layer for support, such as a thicker film, or a polycarbonate sheet, for example. In addition, the abrasive article of the invention can be attached to a base or sheet or directly to a polishing apparatus or machine via any known route, for example, adhesives including pressure sensitive adhesives are useful.

The present invention uses abrasive composites comprising a plurality of abrasive agglomerates, which can be arranged in a single layer on a substrate or backing, and which can be arranged into "three-dimensional" structures wherein a plurality of abrasive particles or abrasive agglomerates extend throughout at least a portion of the thickness, such that eroding, abrading, or removing some of the abrasive particles from the structures or the agglomerates during use exposes additional abrasive particles capable of performing the abrasive function, and preferably maintaining the cut rate on the workpiece. In addition, the conditioning particles may dress or condition the composite binder, thereby exposing new abrasive particles or abrasive agglomerates. The abrasive composites may be abrasive particles or single agglomerates in a make coat and/or size coat, which includes the composite binder. Such single-layer abrasives are three-dimensional when the primary abrasive particles are distributed throughout the thickness of the structures or agglomerates rather than constituting a single layer of primary abrasive particles. The abrasive agglomerates comprise abrasive particles of a first hardness, and are selected to have a hardness sufficient to abrade the intended workpiece, for example via fracture-based lapping or grinding. That is, these abrasive particles generally having a higher hardness than the hardness of the intended workpiece, and they can be termed "primary abrasive." Selection of these abrasive particles is thus driven by the intended workpiece. For example, in one aspect of the invention, the workpiece has a Knoop hardness (all in kg/mm$^2$) of at least about 1000, more preferably at least about 2000. In other aspects, the workpiece has a Knoop hardness of at least about 2200, or at least about 2500. Particular selection of abrasive particles and suitability for a particular workpiece is within the skill of the art, with harder abrasives needed for harder workpieces. For the hardest workpieces, the abrasive particles can be diamond, cubic boron nitride, boron carbide, silicon carbide, and other abrasive grit preferably having a hardness above 2200 kg/mm$^2$. In another aspect of the invention, the workpiece has a Knoop hardness of at least about 600–640 kg/mm², and the abrasive particles generally can be those listed above and any other abrasive grit preferably having a hardness above 640 kg/mm², such as alumina, zirconia, corundum, etc.

Conditioning amalgams are used in the present invention to supply conditioning particles. One example of such particles is abrasive grit that can form part of a slurry during use or in a polishing system. The conditioning particles have a hardness below that of the intended workpiece, such that minimal or no appreciable abrading or grinding of the workpiece results from the conditioning particles. However, the conditioning particles have a hardness above that of the matrix material of the abrasive agglomerates, and the conditioning particles condition or abrade this matrix material to expose fresh abrasive particles. Conditioning particles also may condition the composite binder, especially in a three-dimensional fixed abrasive article to expose fresh abrasive agglomerates.

Composite binder is used in the present invention to form three-dimensional fixed abrasive style regions in the abrasive article. This binder can be resin, glass, glass-ceramic, polymeric, adhesive, and the like. The binder can be formed of a curable (via energy such as UV light or heat) organic material. Examples include amino resins, alkylated urea-formaldehyde resins, melamine-formaldehyde resins, and alkylated benzoguanamine-formaldehyde resin, acrylate resins (including acrylates and methacrylates) such as vinyl acrylates, acrylated epoxies, acrylated urethanes, acrylated polyesters, acrylated acrylics, acrylated polyethers, vinyl ethers, acrylated oils, and acrylated silicones, alkyd resins such as urethane alkyd resins, polyester resins, reactive urethane resins, phenolic resins such as resole and novolac resins, phenolic/latex resins, epoxy resins such as bisphenol epoxy resins, isocyanates, isocyanurates, polysiloxane resins (including alkylalkoxysilane resins), reactive vinyl resins, phenolic resins (resole and novolac), and the like. The resins may be provided as monomers, oligomers, polymers, or combinations thereof. Hardness of the resin varies with the selected composition. For example, resin hardness generally ranges from at least about 18 kg/mm² for the softest epoxy or acrylate resins, and around 40 kg/mm² for phenolic resins.

The abrasive agglomerates of the present invention comprise a matrix material. This material holds the abrasive particles or primary abrasive grit together in the agglomerates, and the agglomerates are included in the abrasive composites. The matrix material can be a resin, a glass, a metal, a glass-ceramic, or a ceramic. For example, glass, such as silica glass, glass-ceramics, borosilicate glass, phenolic, epoxy, acrylic, and the other resins described in the context of the composite binder can be used. More preferably the matrix material comprises a hard, glassy, or brittle material which is then abraded by the conditioning particles in use to release fresh surfaces of primary abrasive grit. Typically, the matrix material is at least as hard as the composite binder, and it can be much harder, especially when made from a different material. For example, the matrix material can have a hardness of at least about 50, more preferably at least about 100, 200, 400, 600, or even harder (all in kg/mm²). For example, silica glass can be used for the matrix material, with a hardness of about 500–600 kg/mm².

Erodible binder is used in the present invention to hold conditioning particles together in the article, and to release the particles during use. Preferably, the erodible binder controllable releases the particles, such as via erosion by the workpiece, or controlled dissolution by a working fluid or additive. Suitable materials include those described above in context of the composite binder. When the erodible binder releases conditioning particles through dissolution, useful binders include paraffin waxes, agar starches, sodium silicates, sodium carboxymethyl cellulose, methyl cellulose, polyvinylalcohol, polyvinylpyrrolidone, polyethyleneoxide or Carbowax™ polyethylene glycol solids from Dow Chemical, Midland, Mich. In addition, the workpiece itself can condition the conditioning amalgams, releasing conditioning particles. The conditioning particles of the invention need not be individual grit or abrasive particles, for they can also be agglomerates, aggregates, or combinations of these with or without individual grit particles.

Conditioning particles used in the present invention are sufficient to condition the composite binder and also may be sufficient to condition the matrix material of the abrasive agglomerates. That is, the conditioning particles have a size range and hardness combination that causes removal of composite binder and/or matrix material to expose fresh abrasive particles. These conditioning particles have a second hardness, which second hardness is less than the hardness of the workpiece and greater than the hardness of the composite binder. The second hardness also is greater than the hardness of the matrix material. Of course, the composite binder and the matrix material can be the same material. These conditioning particles do not appreciably abrade the intended workpiece. That is, the conditioning particles may abrade the workpiece given sufficient time, pressure, and other operating conditions. However, the rate of abrasion contributed by the conditioning particles is minimal, if even measurable. Thus, the primary abrasive particles act upon the workpiece while the conditioning particles act upon the matrix material of the abrasive agglomerates. For example, a typical lapping process may take several minutes to several hours to polish a workpiece, but the conditioning particles (of second hardness) would take at least several days, maybe weeks or months, to polish a similar workpiece or polishing may not occur to any substantial level in any reasonable time period.

Generally, when the conditioning particles are too large, they can prevent fixed abrasive article contact with the workpiece surface, reducing effectiveness. When the conditioning particles are too small, the dressing or conditioning is less effective and the polishing rate diminishes over time. In some embodiments of the present invention, the average particle size of the primary abrasive grit is larger than the average particle size of the conditioning particles. In another aspect, the conditioning particles of the second hardness have an average particle size from below about 125%, below about 100%, below about 75%, or even lower, relative to the average particle size of the abrasive particles of the first hardness. The conditioning particles have an average particle size preferably at least about 50% of the average particle size of the abrasive particles of the first hardness.

Abrasive articles according to the present invention may include a region of the abrasive composite particles along with a region substantially free of the abrasive composite particles. For example, features such as flow channels, wipers, slurry directors, and slurry retainers can be used with little or no abrasive particles.

In one embodiment, the region of abrasive composites and the region of conditioning amalgams are substantially coplanar. The regions can be provided in any suitable geometry. In one embodiment, the region of conditioning amalgams are sized similarly to the workpiece size, such that the workpiece can abrade or erode the conditioning abrasive amalgams to release conditioning particles or grit. This grit can be carried by a working fluid to form a conditioning slurry, which then acts upon the matrix material, effectively conditioning the primary abrasive of the invention.

Any known working fluid can be used. For example, water, aqueous solutions, and the like can be used, with particular selection within the skill of the art. Various additives also can be incorporated, such as lubricants, coolants, grinding aids, dispersing agents, suspending agents, and the like. Additives also may be used to chemically interact with the workpiece surface to improve the polishing process. In addition, chemistry can be used to controllable release the conditioning particles from the region of conditioning amalgams. That is, mechanical and/or chemical action can release the conditioning grit or particles into a liquid to comprise a conditioning slurry.

In one embodiment, the regions of different abrasives are capable of guiding fluid flow. For example, regions can guide conditioning slurry flow toward the center of a circular abrasive embodiment. In another example, regions can encourage conditioning slurry to flow toward the edge of an abrasive embodiment of the invention.

The workpiece in the present invention has a hardness below the hardness of the primary abrasive, and above the hardness of the conditioning particles. The workpiece generally is abraded via brittle polishing or fracture-based grinding. Examples of workpiece materials include quartz, gallium arsenide, germanium, topaz, spinel, Aluminum Oxy Nitride (ALON), SiC, sapphire, and c-plane sapphire.

In one embodiment, the invention provides a fixed abrasive article suitable for polishing hard substrates, using abrasive particles of a hardness of at least about 2000, 2100, or 2200 kg/mm$^2$. These abrasive particles are included in a matrix material such as glass to form abrasive composites. In addition, a region of conditioning amalgams is included together with a region of abrasive composites on the same side of a substrate, such as a polymeric film (e.g., polyester). The conditioning amalgams contain conditioning particles with a hardness at least about 50, or even at least about 100 kg/mm$^2$ softer than the hardness of the abrasive particles. The composite binder can be a make coat and/or size coat, and the composite binder can hold abrasive composites into a three-dimensional abrasive article. In one aspect, the conditioning particles are below about 125%, below about 100%, or even below about 75% of the average particle size of the abrasive particles. In one aspect, the conditioning particles average particle size is at least about 50% of the average particle size of the abrasive particles. In some embodiments, the conditioning particles have a particle size of below about 10 µm, below about 5 µm, below about 0.5 µm, or even below about 0.1 µm. In some embodiments, the abrasive particles have an average particle size above about 1 µm, above about 5 µm, about 8 µm, 10 µm, 15 µm, or even above about 20 µm. These abrasive particles are combined into agglomerates of any desired size. For example, agglomerates typically range from at least about three times the average particle size of the abrasive particles therein. Agglomerates typically range from below about 20 times the average particle size of the abrasive particles therein. In some aspects, the conditioning particles preferably are smaller than the abrasive particles. In one aspect, conditioning particles having an average particle size of about 5 µm are used with abrasive particles having an average particle size of about 8–10 µm, in agglomerates of about 150–200 µm particle size. For example with a sapphire workpiece, 8–10 µm diamond particles can be used in agglomerates of about 170–190 µm particle size, together with alumina conditioning particles of 1–5 µm.

Thus, in one embodiment, the invention provides a fixed abrasive article for polishing a workpiece comprising a substrate having a first surface and a second surface, a region of abrasive composites distributed on the first surface of the substrate, and a region of conditioning amalgams distributed on the first surface of the substrate. The abrasive composites including a composite binder and abrasive particles and/or agglomerates of abrasive particles, which abrasive particles having a hardness of at least about 2500 kg/mm$^2$. When used as agglomerates, the abrasive particles are combined together with a matrix material having a hardness of at least about 18 kg/mm$^2$. The conditioning amalgams include an erodible binder and conditioning particles sufficient to condition the composite binder and having a second hardness, which second hardness is less than 2500 kg/mm$^2$, about equal to or greater than the hardness of the composite binder, and about equal to or greater than the hardness of the matrix material, when used. To release the conditioning particles, the second hardness can be greater than the hardness of the erodible binder, or a dissolving binder can be used.

The abrasive articles of the present invention can be made via any known method for making a coated abrasive or an abrasive article having three-dimensional, textured abrasive composites. For example, abrasive agglomerates and conditioning abrasive can be provided in regions upon one of the substrates described above, and attached using a binder as described above. In addition, any known size coat can be provided over the agglomerates and conditioning abrasive. For another example, a substrate having a structured surface (e.g., peaks and valleys, shaped features such as pyramids, cubes, trapezoids, and the like) can be used, with the abrasive agglomerates and conditioning abrasive provided in separate regions. In another example, abrasive composites containing abrasive agglomerates can be used to form a structured surface while the conditioning abrasive regions can be provided around the structured surface.

Useful methods are described in U.S. Pat. No. 5,152,917 (Pieper et al.) and U.S. Pat. No. 5,435,816 (Spurgeon et al.) which are herein incorporated by reference. Other descriptions of suitable methods can be found in U.S. Pat. Nos. 5,437,754; 5,454,844 (Hibbard et al.), U.S. Pat. No. 5,437,7543 (Calhoun); U.S. Pat. No. 5,435,816 (Spurgeon et al.) and U.S. Pat. No. 5,304,223 (Pieper et al.), all herein incorporated by reference. Abrasive agglomerates suitable for inclusion in the three-dimensional, textured abrasive composites may be manufactured by any known method, such as those described in U.S. Pat. No. 6,551,366 (D'Souza et al.); U.S. Pat. No. 6,645,624 (Adefris et al.); U.S. Pat. No. 5,651,729 (Benguerel); U.S. Pat. No. 5,975,988 (Christianson); and U.S. Pat. No. 4,799,939 (Bloecher et al.). Another useful method of providing the abrasive article having three-dimensional, textured abrasive composites according to the present invention wherein the composites comprise abrasive agglomerates fixed in a make coat with optional size coatings is described in U.S. Pat. No. 6,217,413 (Christianson).

The invention generally is useful in grinding or lapping or polishing operations, especially with hard or brittle workpieces. In one aspect, the invention allows the cut rate of the abrasive article to be maintained at a desired level for extended time periods without the need for a separate, or off-line, abrasive dressing or conditioning process. In another aspect, the invention provides an improved removal rate stability and predictability, which improves process efficiency and reduces scrap during finishing operations.

Objects and advantages of this invention are further illustrated by the following examples, but the particular materials and amounts thereof recited in these examples, as well as other conditions and details, should not be construed to unduly limit this invention.

EXAMPLES

Preparation of Vitreous Bonded Diamond Agglomerates

Vitreous bonded diamond agglomerates were produced generally using the method of U.S. Pat. No. 6,319,108 (Adefris, et al.). First, a temporary binder solution was prepared by dissolving 25 parts by weight (pbw) dextrin (available as "STANDEX 230" from A. E. Stanley Mfg. Co., Decatur, Ill.) in 75 pbw deionized water.

A slurry comprising 170.0 g of the temporary binder solution, 4.0 g of a 50 wt % solution of AY 100 surfactant (available from Cytek Industries, Stamford, Conn.) in methyl ethyl ketone, and 1.3 g Dow Corning Additive 65 (a silicone emulsion anti-foaming agent available from Dow Corning Corp., Midland, Mich.) were thoroughly mixed with a propeller mixing blade for 15–20 minutes. Milled glass frit was prepared by charging 20 g methanol with 800 g glass frit (SP1086 glass from Specialty Glass Inc., Oldsmar, Fla.) into a Number 2 milling jar (2.2 gallon (8.3 L) jar, made of alumina-fortified porcelain from U.S. Stoneware, East Palestine, Ohio. The jar also contained about 16.9 kg of 0.6-cm (0.25 inch) zirconia milling pellets. The combination was milled for 72 h at about 130 rpm, then the mill was discharged. A quantity of 200.0 g of the milled glass frit was added to the slurry and mixing continued for 20 minutes. Diamond abrasive particles having a nominal particle size of 20 μm (available from National Research Corp., Chesterfield, Mich.) were then added to the slurry and the combination was mixed for an additional 20 minutes.

The resulting slurry was then coated into the cavities of a polypropylene tool and the excess slurry was removed using a doctor blade. The tool was made according to the teachings of U.S. Pat. No. 5,152,917 (Pieper et al.). The cavities in the polypropylene tool were in the form of truncated four-sided pyramids having a depth of 178 μm, an opening of 246 μm by 246 μm and a base of 151 μm by 151 μm. The slurry in the cavities of the tool was air dried at room temperature for 24 hours. After drying, the dried abrasive composite precursors were urged from the tool by contacting the back surface of the tool with an ultrasonically driven vibrating titanium bar (available as Branson 902R, from Branson Ultrasonic Instruments, Danbury, Conn.).

The dried precursor particles were passed through standard sieves of 250 μm opening followed by 150 μm. The dried precursor particles remaining on the 150 μm opening sieve were mixed with an inorganic parting agent consisting of Boehmite powder (alumina monohydrate, Disperal, commercially available from Condea Chemie GmbH, Brunsbuttel, Germany) at a ratio of 100 g dried precursor particles to 6 g Boehmite powder. The dried precursor and parting agent mixture was fired in a refractory sager (available from Ipsen Ceramic, Pecatonica, Ill.). The firing temperature was ramped from room temperature to 400° C. at a rate of 1.5° C. per min. and was then held at 400° C. for 2.0 h to burn off the temporary binder. The precursors were then heated to 720° C. at a rate of 2° C. per min. and were held at 720° C. for 1.0 h in an air atmosphere. Following firing, the resulting porous ceramic abrasive composites were cooled to room temperature at a rate of about 2° C. per min. The fired porous ceramic abrasive composites were passed through standard sieves of 250 μm opening followed by 150 μm to remove the inorganic parting agent. The fired porous ceramic abrasive composites remaining on the 150 μm opening were then collected for use in the abrasive articles.

Preparation of Abrasive Agglomerates Dispersed in Binder Precursor

A dispersant solution of 25 wt % dispersant (Solsperse™ 32000, available from Noveon Division, Lubrizol Ltd., Manchester, U.K.) and 75 wt % acrylate resin (SR 368 D, available from Sartomer Co., Inc., Exton, Pa.) was mixed for approximately 1 h using an air driven propeller mixer. Vazo 52 thermal initiator (available from Dupont Chemical Solution Enterprise, Bell, W. Va.) was crushed prior to mixing into the resin by placing the Vazo 52 in a sealed plastic bag, placing the bag on a sturdy surface (lab bench top), and using a ceramic mortar to break up the Vazo 52 into fine particulates. During mixing the mixture was placed in a heated water bath (60° C.) to facilitate melting of the dispersant into the resin. A thermal initiator solution was produced by mixing 5 wt % Vazo 52 into 95 wt % acrylate resin (SR368 D) using a propeller mixer. The thermal initiator solution was stored in a refrigerator (temperature<40° C.). Calcium metasilicate (NYAD M400 Wollastonite, available from NYCO Minerals Inc., Hermosillo Sonora, Mexico) was dried before use by placing the NYAD M400 into a metal container and heating the container in an oven set at 120° C. for 2–4 days. The NYAD M400 was then cooled to room temperature and the container sealed with vinyl tape until use. A resin pre-mix was produced by mixing the following components using a high speed Cowels blade mixer: 91 wt % 368 D resin, 8 wt % dispersant solution described above, and 1 wt % photoinitiator (Irgacure 819, available from Ciba Specialty Chemicals, Tarrytown, N.Y.). This was mixed for approximately 1 h until the photoinitiator had dissolved, to form a resin pre-mix.

An abrasive slurry was produced by mixing 1547.8 g of resin premix described above with 2935 g of NYAD M400 Wollastonite, 100 g 180 μm vitrified diamond agglomerates produced as described above, 45 g fumed silica (OX 50, available from Degussa Corporation, Parsippany, N.J.), and 2.5 g antifoam (Dow Corning Additive #7, available from Dow Corning Corp.) under high shear for 1 h. The mixture was then placed in a sealed plastic pail and rotated at 20 rotations per minute (rpm) on a roller mill (available from U.S. Stoneware) for 18–24 h to form a slurry. The slurry was then removed from the roller mill and mixed under low shear, during which 370 g of thermal initiator solution described above was added. The slurry was mixed for approximately 30 min. or until the temperature reached 32° C. (90° F.).

Fixed Abrasive Article Preparation (Method I)

This abrasive article was made generally as described in U.S. Pat. No. 5,958,794 (Bruxvoort, et al.) on an apparatus similar to that illustrated in FIG. 15 of this patent.

A polypropylene tool was provided comprising an array of cavities. The cavities in the tool were in the form of inverted truncated four-sided pyramids having a depth of 800 μm, an opening of 2800 μm by 2800 μm and a base of 2518 μm by 2518 μm with a center-to-center spacing of 3976 μm. The tool was essentially the inverse of the desired shape, dimensions, and arrangement of the abrasive composites.

The tool was unwound from a winder. The dispersion of abrasive agglomerates in abrasive composite binder precursor was coated and applied into the cavities of the tool using a vacuum slot die coater at room temperature. Next, a polyester backing (127 μm thick (5 mil) polyester film having an ethylene acrylic acid co-polymer primer on the surface to be coated –125 μm (5 mil) Scotchpak™ available from 3M Company, St. Paul, Minn.) was contacted with the abrasive slurry-coated tool such that the abrasive slurry wetted the primed surface of the backing. Ultraviolet (UV) light radiation was transmitted through the tool and into the abrasive slurry. Two different UV lamps were used in series. The first UV lamp was a Fusion System "V" bulb and operated at 236.2 W/cm (600 Watts/inch). The second was a Fusion System "D" bulb and operated at 236.2 W/cm (600 W/inch). Upon exposure to UV radiation, the binder precursor was converted into a binder and the abrasive slurry was converted into an abrasive composite. The tool was removed from the abrasive composite/backing. The abrasive composite/backing was then exposed to an additional treatment of UV radiation, through the backing side, using a Fusion System "D" bulb and operated at 236.2 W/cm (600 W/inch).

Then, the abrasive composite/backing, which formed the abrasive article, was wound upon a core. This was a continuous process operated at between about 4.6 to 7.6 m/min. (15 to 25 feet/min.). The abrasive composite/backing wound up on the a core was then heated for approximately 8 h in an oven set at 80 to 105° C. to complete the cure of the binder systems and to activate the primer on the polyester backing.

To prepare the abrasive article for testing, abrasive composite/backing sheets were laminated to a 0.762 mm (0.030 inch) thick polycarbonate sheet (Lexan™ 8010MC, available from GE Polymer Shapes, Mount Vernon, Ind.) using a pressure sensitive adhesive tape ("442 KW", available from 3M, St. Paul, Minn.). A 30.48 cm (12 in.) diameter circular test sample was die cut for testing.

Conditioning Amalgam Article—Method II

A conditioning amalgam precursor mixture of 75 g of 15 μm conditioning particles (PWA alpha alumina, available as Microgrit PWA 15, from Fujimi Corporation, Wilsonville, Oreg.), 5 g of dispersant (Disperbyk 180, from BYK-Chemie, Wallingford, Conn.), 20 g of trimethylolpropane triacrylate (TMPTA) (Sartomer SR351, from Sartomer Company, Inc., Exton, Pa.), and 1.0 g photoinitiator (Irgacure 819, from Ciba Specialty Chemicals, Tarrytown, N.Y.) was prepared and converted into a structured conditioning amalgam as described in Method I. Segments were then die cut to fit openings in a previously prepared 30.48 cm (12 in.) disk of a fixed abrasive article prepared by Method I.

Conditioning Amalgam Article—Method III

After developing the conditioning amalgam article by Method II, the conditioning amalgam structure was flooded and filled with the conditioning amalgam precursor of Method II, leveled with a polypropylene release backing and UV cured to produce a planar conditioning abrasive sheet. Segments were then die cut to fit openings in a previously prepared 30.48 cm (12 in.) disk of a fixed abrasive article prepared by Method I.

Conditioning Amalgam Article—Method IV

After producing a fixed abrasive article by Method I, regions to be replaced by planar conditioning amalgam features were removed from the abrasive face of a 30.5 cm (12 in.) disk to provide gaps.

A conditioning amalgam precursor mixture of 20 g resole resin (75 wt % solids in water, 1.5:1 by weight formaldehyde:phenolic, 2.5% KOH catalyzed), 80 g 15 μm conditioning particles (PWA alpha alumina, Microgrit PWA 15), 15 g water, and 15 g isopropyl alcohol was prepared. This mixture was used to fill the gaps in the fixed abrasive article and leveled with a rubber knife or squeegee. The abrasive was then cured in an oven set at 60° C. for 30 min., 85° C. for 30 min., 105° C. for 30 min., and 120° C. for 2 h to form a fixed abrasive article.

Single Sided Lapping Test

Tests were performed on the Phoenix 4000 single sided lapping machine obtained from Buehler Ltd., Lake Bluff, Ill. A fixed abrasive pad was mounted to the platen using a pressure sensitive adhesive. The diamond fixed abrasive pad was prepared for testing by initial conditioning using an alumina fixed abrasive (268 XA-A35, available from 3M Company). The 268 XA alumina fixed abrasive was mounted to three, 65 mm (2.56 in.) diameter×3.18 mm (0.125 in.) thick Borofloat™ glass disks (Swift Glass, Elmira, N.Y.). The three Borofloat™ disks with the 268 XA abrasive on their surface were mounted to a 152 mm (6 in.) diameter×15 mm (0.6 in.) thick aluminum metal plate using mounting wax (Crystalbond 509 Clear, Aremco Products, Inc., Calley Cottage, N.Y.) to form a conditioning plate. The conditioning plate was attached to the upper head of the lapping machine with a quick disconnect mount. The lapping machine was run at an applied pressure of 34.5 kPa (5 psi) for 1 minute using a 180 rpm platen and a counter rotating 100 rpm substrate. During conditioning, 10 vol % Sabrelube 9016 (Chemetall Oakite, Lake Bluff, Ill.) in deionized water was supplied at a flow rate of 30 mL/min. The initial conditioning process was completed by lapping Borofloat™ glass (three 65-mm substrates affixed to a metal plate with mounting wax) at 55.2 kPa (8 psi) for 5 min. using machine conditions described above. Prior to each sapphire lapping test, window glass substrates (Swift Glass) were lapped using a pressure of 34.5 kPa (5 psi) and the specified machine conditions for between 8–9 min. until a stable window glass removal rate of between 330–360 μm/min was achieved. The removal rate of the window glass substrates and the sapphire workpieces was calculated by converting the weight loss during lapping (M in grams) to thickness removed (T in μm) by using the following equation:

$$T = 10{,}000 * M/(A*D)$$

where A=area of the substrate (cm$^2$) and D=density of the substrate (g/cm$^3$), and sapphire had a density of 3.9 g/cm$^3$ and window glass had a density of 2.4 g/cm$^3$.

Each of the self-contained conditioning abrasive articles of the Examples below was laminated to a polycarbonate sheet (30.5 cm (12 in.)) diameter using double-sided adhesive and the fixed abrasive was trimmed to that diameter. Lapping runs of 5 min. each were conducted at 34.5 kPa (5 psi) using the machine conditions specified on C-plane sapphire (Crystal Systems, Salem, Mass.). Results are shown in Table I, below.

Example 1

A fixed abrasive article was prepared by inserting eight 5-cm diameter circular regions of planar conditioning amalgam segments prepared by Method III into a 30.5 cm (12 in.) disk of a fixed abrasive article prepared by Method I. The eight disks were evenly spaced around the perimeter approximately 3.8 cm (1.5 in.) from the edge.

Example 2

A fixed abrasive article was prepared by inserting eight 5-cm diameter circular regions of textured conditioning amalgam segments prepared by Method II into a 30.5 cm (12 in.) disk of a fixed abrasive article prepared by Method I. The eight disks were spaced as in Example 1.

Example 3

A fixed abrasive article was prepared by cutting a 30.5 cm (12 in.) disk from a sheet having alternating stripes of the fixed abrasive article prepared by Method I and the textured conditioning amalgam segment prepared by Method II. The stripes of fixed abrasive article were 5 cm (2 in.) wide and the stripes of textured conditioning amalgam were 2.54 cm (1 in.) wide.

Example 4

A fixed abrasive article was prepared by inserting eight 5 cm diameter circular regions of planar conditioning amalgam segment prepared by Method IV into a 30.5 cm (12 in.) disk of a fixed abrasive article prepared by Method I. The eight disks were evenly spaced around the perimeter approximately 3.8 cm (1.5 in.) from the edge.

Example 5

A fixed abrasive article was prepared by inserting sixteen 2.5-cm diameter circular regions of planar conditioning amalgam segment prepared by Method IV into a 30.5 cm (12 in.) disk of a fixed abrasive article prepared by Method I. The eight disks were spaced as in Example 1 but approximately 5 cm (2 in.) from the edge.

Example 6

A fixed abrasive article was prepared by inserting two concentric rings of planar conditioning amalgam segment prepared by Method IV into a 30.5 cm (12 in.) disk of a fixed abrasive article prepared by Method I. The first ring was 1.27 cm (0.5 in.) wide with an inner diameter of 6.35 cm (3 in.). The second ring was 1.6 cm (0.63 in.) wide with an inner diameter of 10.2 cm (4 in.).

Example 7

A fixed abrasive article was prepared by inserting two concentric planar conditioning amalgam segments prepared by Method IV into a 30.48 cm (12 in.) disk of a fixed abrasive article prepared by Method I to obtain nested squares of alternating fixed abrasive material and planar conditioning materials. The central square of fixed abrasive material was 8.9×8.9 cm (3.5×3.5 in.) surrounded by stripes of planar conditioning material 0.66 cm (0.25 in.) wide, surrounded by stripes of fixed abrasive 0.94 cm (0.38 in.), surrounded by a second set of stripes of planar conditioning material 3.18 cm (1.25 in.) wide, all centered in the 30.5 cm disk.

Comparative Example A (CE-A)

A fixed abrasive article was prepared by Method I and tested.

TABLE I

| Example | Cumulative Time (min.) | Removal Rate (µm/min.) |
|---|---|---|
| 1 | 11 | 50.3 |
|   | 21 | 40.9 |
|   | 31 | 39.1 |
|   | 41 | 50.3 |
|   | 46 | 44.7 |

TABLE I-continued

| Example | Cumulative Time (min.) | Removal Rate (µm/min.) |
|---|---|---|
| 2 | 11 | 27.6 |
|   | 21 | 2.3 |
| 3 | 5 | 32 |
|   | 10 | 24 |
|   | 15 | 15 |
|   | 20 | 10 |
| 4 | 10 | 112.8 |
|   | 20 | 77.9 |
|   | 30 | 81.5 |
|   | 40 | 71.5 |
|   | 50 | 25.6 |
|   | 60 | 70.1 |
|   | 70 | 22.2 |
| 5 | 10 | 54.4 |
|   | 20 | 2.0 |
|   | 30 | 3.9 |
|   | 35 | 1.5 |
| 6 | 10 | 83.6 |
|   | 20 | 78.7 |
|   | 30 | 11.1 |
|   | 40 | 3.0 |
| 7 | 10 | 72.8 |
|   | 20 | 17.9 |
|   | 30 | 10.2 |
|   | 40 | 27.3 |
|   | 50 | 35 |
| CE-A | 5 | 17 |
|   | 10 | 2 |
|   | 15 | 1 |

It is apparent to those skilled in the art from the above description that various modifications can be made without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A fixed abrasive article for polishing a workpiece having a hardness comprising:
   (a) a substrate having a first surface and a second surface;
   (b) a region of abrasive composites distributed on the first surface of the substrate, the abrasive composites including a composite binder and abrasive particles of a first hardness, wherein the first hardness is higher than the hardness of the workpiece; and
   (c) a region of conditioning amalgams distributed on the first surface of the substrate, the amalgams including an erodible binder and conditioning particles sufficient to condition the composite binder and having a second hardness, which second hardness is less than the hardness of the workpiece and greater than the hardness of the composite binder.

2. The fixed abrasive article of claim 1 wherein the abrasive particles are provided in agglomerates together with a matrix material.

3. The fixed abrasive article of claim 2 wherein the conditioning particles are sufficient to condition the matrix material.

4. The fixed abrasive article of claim 1 wherein the conditioning particles have an average particle size below the average particle size of the abrasive particles of the first hardness.

5. The fixed abrasive article of claim 1 wherein the conditioning particles have an average particle size from about 50 to about 100% of the average particle size of the abrasive particles.

6. The fixed abrasive article of claim 1 further comprising a region substantially free of the abrasive composites, which region may include fluid channels.

7. The fixed abrasive article of claim 6 wherein the regions of abrasive composites and regions of conditioning amalgams are substantially coplanar.

8. The fixed abrasive article of claim 1 wherein the matrix material comprises a resin, a glass, a metal, a glass-ceramic, or a ceramic.

9. The fixed abrasive article of claim 1 wherein the abrasive particles comprise diamond or silicon carbide, boron carbide, cubic boron nitride, or a combination thereof.

10. The fixed abrasive article of claim 1 wherein the conditioning particles comprise alumina, corundum, zirconia, ceria, glass, or a combination thereof.

11. The fixed abrasive article of claim 1 wherein the hardness of the conditioning particles is sufficient to condition the composite binder.

12. The fixed abrasive article of claim 1 wherein the substrate of the abrasive article and the composite binder are substantially the same material.

13. The fixed abrasive article of claim 1 wherein the agglomerates comprise an abrasive suitable for polishing sapphire, while the conditioning particles have a hardness below about 2100 kg/mm$^2$.

14. The fixed abrasive article of claim 1 further comprising an adhesive suitable for attaching the fixed abrasive article to a polishing machine, optionally wherein the adhesive is a pressure-sensitive adhesive.

15. A method of making a fixed abrasive article for polishing a workpiece having a hardness according to claim 1 comprising:
  (a) providing a substrate having a first surface and a second surface;
  (b) providing a region of abrasive composites distributed on the first surface of the substrate, the abrasive composites including a composite binder and abrasive agglomerates, which agglomerates include abrasive particles of a first hardness together with a matrix material, and wherein the first hardness is higher than the hardness of the workpiece; and
  (c) providing a region of conditioning amalgams distributed on the first surface of the substrate, the amalgams including an erodible binder and conditioning particles of a second hardness, which second hardness is less than the hardness of the workpiece and which is sufficient to condition the matrix material of the abrasive agglomerates.

16. A fixed abrasive article for polishing a workpiece having a Knoop hardness below about 2500 kg/mm$^2$ comprising:
  (a) a substrate having a first surface and a second surface;
  (b) a region of abrasive composites distributed on the first surface of the substrate, the abrasive composites including a composite binder and abrasive agglomerates, which agglomerates include abrasive particles having a Knoop hardness above the hardness of the workpiece together with a matrix material; and
  (c) a region of conditioning amalgams distributed on the first surface of the substrate, the amalgams including an erodible binder and conditioning particles having a Knoop hardness below the hardness of the workpiece and higher than the hardness of the matrix material of the abrasive agglomerates.

17. The abrasive article of claim 16 wherein the abrasive particles have a Knoop hardness above about 2500 kg/mm$^2$.

18. The abrasive article of claim 16 wherein the regions of abrasive composites and regions of conditioning amalgams are substantially coplanar.

19. The fixed abrasive article of claim 16 further comprising fluid channels.

20. A method of making a fixed abrasive article according to claim 16 for polishing a workpiece having a Knoop hardness below about 2500 kg/mm$^2$ comprising:
  (a) providing a substrate having a first surface and a second surface;
  (b) providing a region of abrasive composites distributed on the first surface of the substrate, the abrasive composites including a composite binder and abrasive agglomerates, which agglomerates include abrasive particles having a Knoop hardness of at least 2500 kg/mm$^2$ together with a matrix material; and
  (c) providing a region of conditioning amalgams distributed on the first surface of the substrate, the amalgams including an erodible binder and conditioning particles having a Knoop hardness below the hardness of the workpiece and higher than the hardness of the matrix material of the abrasive agglomerates.

21. A polishing system comprising:
  (1) a fixed abrasive article for polishing a workpiece having a hardness wherein the fixed abrasive article comprises
    (a) a substrate having a first surface and a second surface;
    (b) a region of abrasive composites distributed on the first surface of the substrate, the abrasive composites including a composite binder and abrasive agglomerates, which agglomerates include abrasive particles of a first hardness together with a matrix material, and wherein the first hardness is higher than the hardness of the workpiece; and
    (c) a region of conditioning amalgams distributed on the first surface of the substrate, the amalgams including an erodible binder and conditioning particles of a second hardness, which second hardness is less than the hardness of the workpiece and greater than the hardness of the matrix material of the abrasive agglomerates; and optionally
  (2) a slurry abrasive.

22. A fixed abrasive article for polishing a workpiece comprising:
  (a) a substrate having a first surface and a second surface;
  (b) a region of abrasive composites distributed on the first surface of the substrate, the abrasive composites including a composite binder and abrasive agglomerates, which agglomerates include abrasive particles having a hardness of at least about 2500 kg/mm$^2$ together with a matrix material having a hardness of at least about 18 kg/mm$^2$; and
  (c) a region of conditioning amalgams distributed on the first surface of the substrate, the amalgams including an erodible binder and conditioning particles sufficient to condition the composite binder and having a second hardness, which second hardness is less than 2500 kg/mm$^2$, about equal to or greater than the hardness of the composite binder, and about equal to or greater than the hardness of the matrix.

23. The fixed abrasive article of claim 22 wherein the conditioning particles have an average particle size below the average particle size of the abrasive particles.

* * * * *